(12) United States Patent
Hartenstine et al.

(10) Patent No.: US 7,625,043 B2
(45) Date of Patent: Dec. 1, 2009

(54) CHILD CAR SEAT WITH MULTIPLE USE CONFIGURATIONS

(75) Inventors: Curtis M. Hartenstine, Birdsboro, PA (US); Sharon A. Gillett, Shillington, PA (US); Robert E. Haut, West Chester, PA (US)

(73) Assignee: Wonderland Nurserygoods Co., Ltd., Taipei (TW)

( * ) Notice: Subject to any disclaimer, the term of this patent is extended or adjusted under 35 U.S.C. 154(b) by 455 days.

(21) Appl. No.: 11/519,465

(22) Filed: Sep. 12, 2006

(65) Prior Publication Data

US 2007/0057547 A1 Mar. 15, 2007

Related U.S. Application Data

(60) Provisional application No. 60/717,331, filed on Sep. 15, 2005, provisional application No. 60/760,235, filed on Jan. 19, 2006.

(51) Int. Cl.
*A47C 1/08* (2006.01)

(52) U.S. Cl. ............ 297/250.1; 297/256.1; 297/258.13; 297/255

(58) Field of Classification Search .............. 297/250.1, 297/256.1, 256.13, 255, 410
See application file for complete search history.

(56) References Cited

U.S. PATENT DOCUMENTS

| | | | | |
|---|---|---|---|---|
| 4,632,456 | A | | 12/1986 | Kassai .......................... 297/328 |
| 4,754,999 | A | | 7/1988 | Kain ............................ 297/250 |
| 5,181,761 | A | * | 1/1993 | Meeker ................... 297/256.13 |
| 5,609,393 | A | * | 3/1997 | Meeker et al. .......... 297/256.13 |
| 5,746,478 | A | | 5/1998 | Lumley ................... 297/256.13 |
| 5,845,968 | A | * | 12/1998 | Lovie ....................... 297/256.1 |
| 6,033,019 | A | * | 3/2000 | Hession-Kunz et al. .. 297/250.1 |
| 6,428,099 | B1 | * | 8/2002 | Kain ....................... 297/256.1 |
| 6,554,358 | B2 | | 4/2003 | Kain ...................... 297/256.13 |
| 6,623,074 | B2 | * | 9/2003 | Asbach et al. ............ 297/250.1 |
| 6,682,143 | B2 | | 1/2004 | Amirault .................. 297/250.1 |
| 6,857,700 | B2 | * | 2/2005 | Eastman et al. .......... 297/250.1 |
| 6,877,809 | B2 | * | 4/2005 | Yamazaki et al. ........... 297/253 |
| 6,908,151 | B2 | * | 6/2005 | Meeker et al. ........... 297/250.1 |
| 7,086,695 | B2 | * | 8/2006 | Hosoya .................. 297/256.16 |
| 7,131,692 | B2 | * | 11/2006 | Huang ...................... 297/250.1 |
| 7,232,185 | B2 | * | 6/2007 | Hartenstine et al. ...... 297/250.1 |
| 7,246,852 | B2 | * | 7/2007 | Balensiefer .............. 297/250.1 |
| 7,370,912 | B2 | * | 5/2008 | Williams et al. ........ 297/256.11 |
| 2004/0108758 | A1 | * | 6/2004 | Eastman et al. .......... 297/250.1 |
| 2004/0124677 | A1 | * | 7/2004 | Meeker et al. ............... 297/255 |
| 2004/0124678 | A1 | * | 7/2004 | Williams et al. ....... 297/256.11 |
| 2004/0189068 | A1 | * | 9/2004 | Meeker et al. ........... 297/250.1 |

* cited by examiner

*Primary Examiner*—Laurie K Cranmer
(74) *Attorney, Agent, or Firm*—Miller Law Group, PLLC

(57) ABSTRACT

A car seat is formed with a seat member pivotally connected to a base member for positional adjustment in desired reclined positions controlled by an intuitively operable adjustment mechanism. The seat back is pivotally connected to the seat member to be oriented in a shipping position or an operative position. A latching mechanism secures the seat back to the seat member in the operative position. The seat back is provided with a head rest that is vertically movable relative to the seat back to uncover routing openings in the seat back as the child grows and the head rest is positioned accordingly. The harness is routed through selected routing openings in the seat back before passing over a hanger at the top of the seat back so that the length of the harness remains constant irrespective of the positioning of the harness in conjunction with the size of the child.

22 Claims, 15 Drawing Sheets

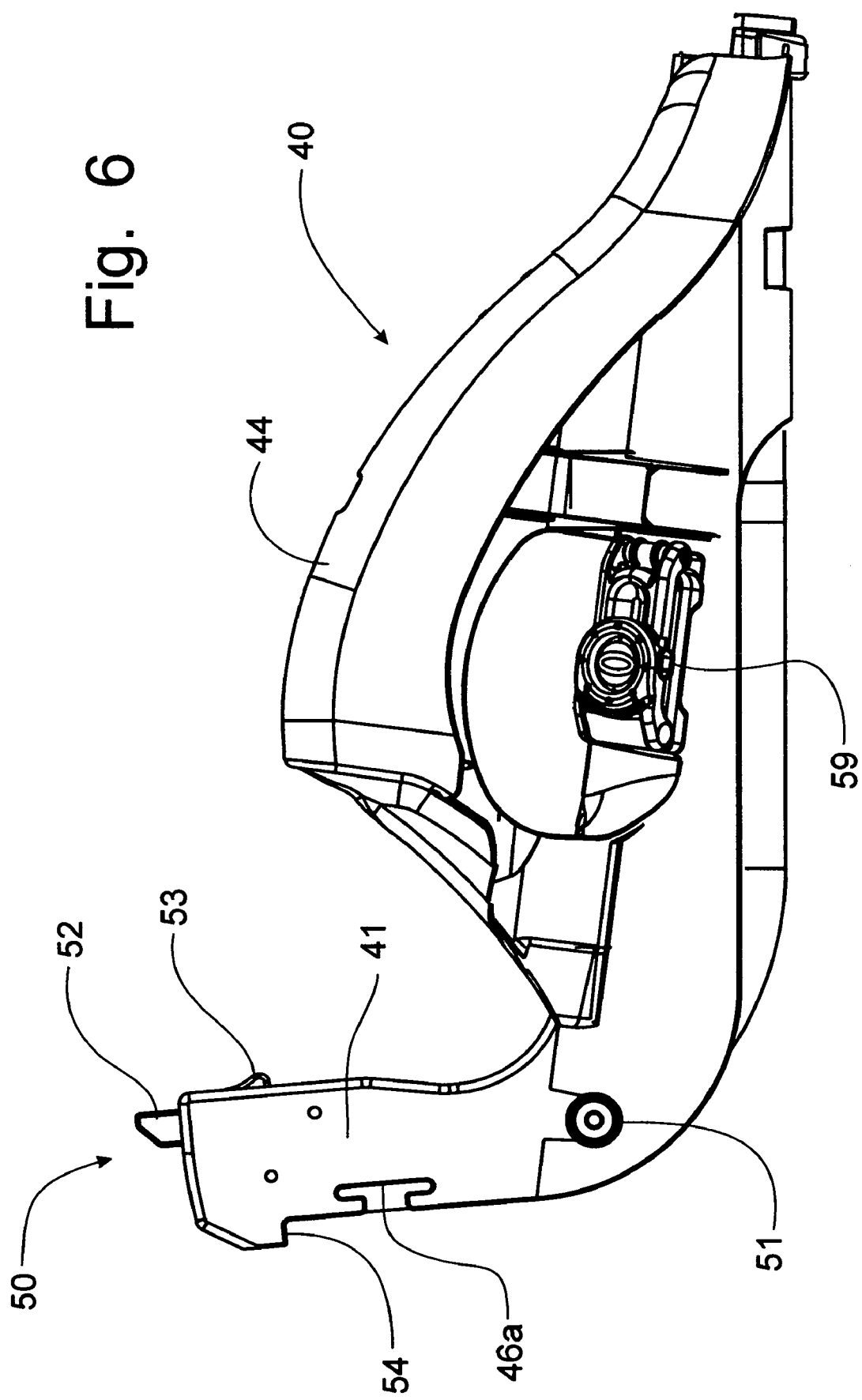

Fig. 13
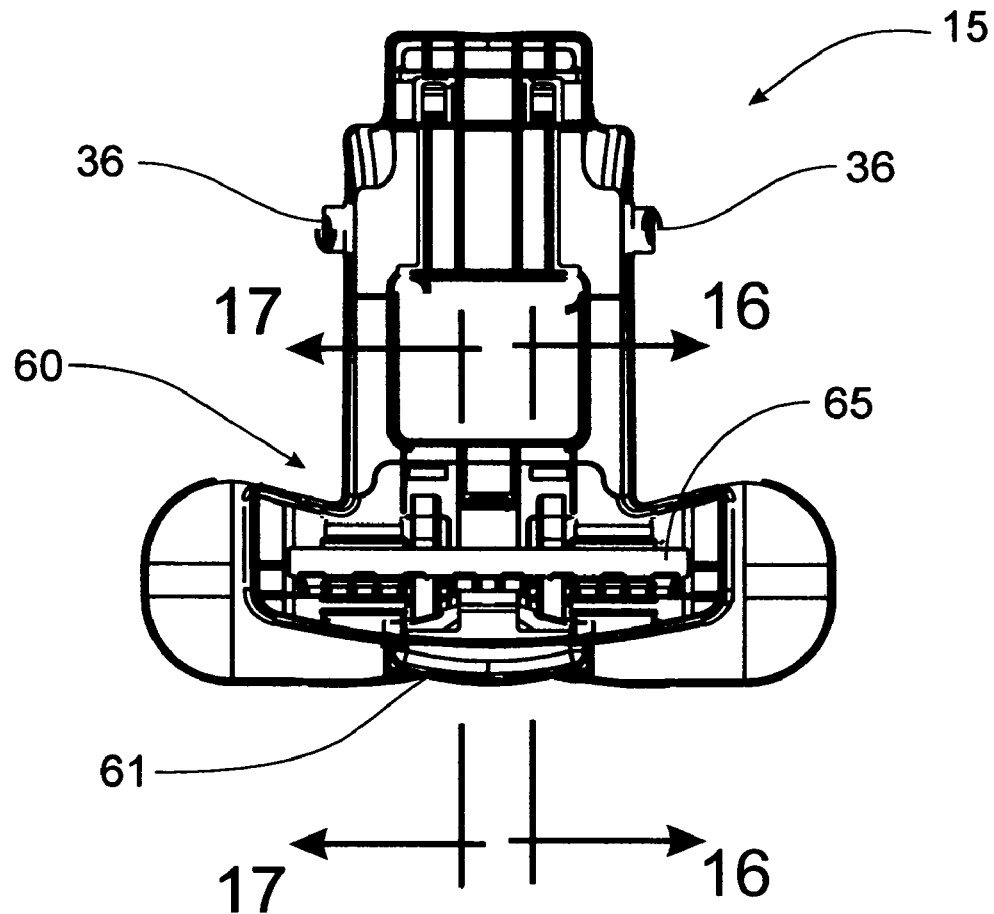
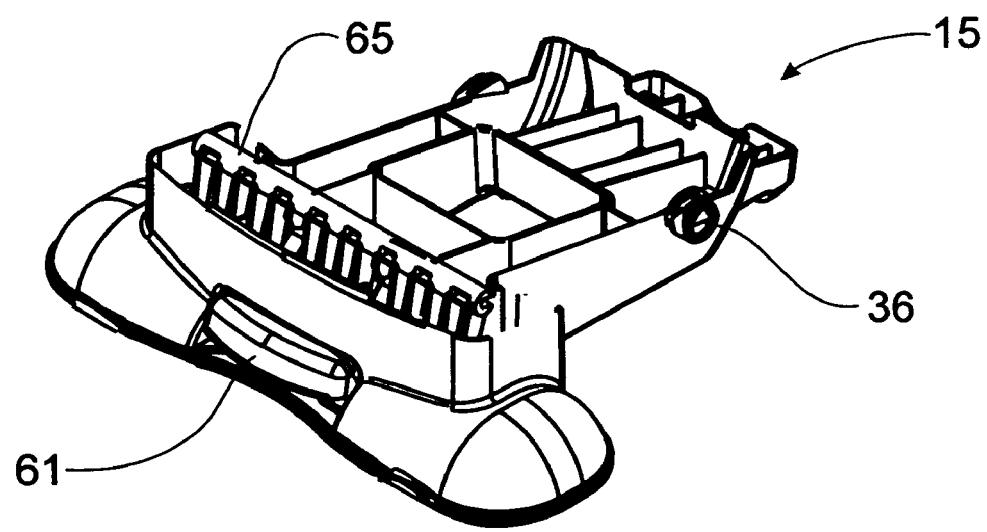
Fig. 14

CHILD CAR SEAT WITH MULTIPLE USE CONFIGURATIONS

CROSS-REFERENCE TO RELATED APPLICATIONS

This application claims priority on U.S. Provisional Patent Application Ser. No. 60/717,331, filed on Sep. 15, 2005, and on U.S. Provisional Patent Application Ser. No. 60/760,235, filed on Jan. 19, 2006, the contents of both provisional patent applications being incorporated herein by reference.

FIELD OF THE INVENTION

The present invention relates generally to a car seat for use in transporting children in an automobile, and, more particularly, to a car seat that can be utilized in different configurations for different sized children until the children are large enough to be transported in an automobile without benefit of a car seat.

BACKGROUND OF THE INVENTION

Car safety seats for children are commercially available in a many configurations corresponding to differences in the age, weight, and size of the child being transported. Parents can choose a car seat that is not only the correct size, but also suits their tastes, budget, and life style. As children grow in size and maturity level, they need different kinds of car seats. For example, a child may initially use a rearwardly facing infant car seat, then graduate to a forward facing toddler seat with an integrated harness, and finally to a belt positioning booster seat utilizing the vehicle's lap and shoulder belt system before being able to safely use the vehicle's seat belts alone.

There are many car seats on the market that can be used in multiple configurations. For instance, a forward facing car seat with an integral harness appropriate for a 20-40 pound child might accommodate a child weighing 30-100 pounds as a belt positioning booster seat with the removal of the harness and utilizing the vehicle's lap and shoulder belts. This is convenient for the care giver because it means fewer seats to purchase. Some parents choose to buy a belt positioning booster seat for their older child. Such a booster seat may be configured with a high back, such as is disclosed in U.S. Pat. No. 6,682,143, granted to Davis Amirault on Jan. 27, 2004, or can have no back at all. Older children who don't want to be seen sitting in a "baby seat" like this option and parents don't have to manage a big bulky car seat.

Currently available car seats typically have a monolithic shell, i.e. the back and seat cannot be used separately. Some car seats are designed to have a no back base option, but are configured as a separate seat fastened under the monolithic seat and back, such as is disclosed in U.S. Pat. No. 4,754,999, issued on Jul. 5, 1998, to James Kain. The problem with this configuration is the redundancy of seats; one as part of the monolithic shell, and one as a seat only.

Several commercially available car seats offer a recline mechanism that allows the seat to recline relative to a base member on which the seat member is supported. Typically, such recline mechanisms are difficult to operate physically and are not intuitive as to how the recline mechanism is operated. The ability to recline is important for comfort for the child being transported in the car seat. Accordingly, a conveniently operable recline mechanism for a car seat would be a desirable feature to be incorporated into the structure of the car seat.

Many commercially available car seats currently route the shoulder belts directly through the shoulder slots provided in the seat back. Typically, car seats will provide shoulder slots at several different heights to accommodate the range of different size children using the product. It is also typical that the shoulder harness can be conveniently loosened and tightened by either releasing or pulling a center strap connected to the shoulder strap and protruding out the front of the seat base for easy access. A simple cam type locking device is use to hold the center strap in the desired position. In order to accommodate a large range of children, the length of adjustment of the center strap has to be long enough to drawn the harness tight when in the lowest shoulder slot positions but also allow enough slack to fit the larger children when the harness is in the highest shoulder slot position. Many times the connection plate which attaches the shoulder belts to the center strap must travel in a range from just below the lowest shoulder slots down and around the junction of the seat back and seat bottom. This repositioning of the connection plate may cause extra friction as the connection plate travels around this junction making it more difficult for the user to tighten or loosen the harness.

These monolithic toddler car seats available on the market today with built in harnesses are configured with the seat and back rigidly and permanently attached. When shipped, this car seat configuration dictates that the packing carton forms a rectangular box shape around the "L" shaped car seat. As a result, a large volume of empty space remains in the carton, taking up shipping space, which is a very inefficient use of the shipping carton.

U.S. Pat. No. 5,845,967, issued on Dec. 8, 1998, to Michael Kane, et al, discloses a car seat for restraining a child in a vehicle having a unitary shell formed in an upper back portion and a lower seat portion connected to an integral hinge. The upper and lower portions are configured to form a lockable mortise and tenon joint therebetween. The booster seat further includes indicia for indicating height limitations of a child sitting in the seat. U.S. Pat. No. 5,845,968, granted to David Lovie on Dec. 8, 1998, teaches a booster seat that includes a spring-loaded detent that can be engaged by the cam members of backrest support member to hold the backrest in an orientation. When the safety seat is not in use, or when it is desired to use the booster cushion without the backrest, the backrest and its support member can be stowed within the booster cushion.

Examples of recline mechanisms for children's car seats can be found in European Patent Application No. EP0301281, published on Feb. 1, 1989; in U.S. Pat. No. 5,746,478, granted on May 5, 1998, to Michael Lumley, et al; in U.S. Pat. No. 5,609,393, issued to Paul Meeker, et al on Mar. 11, 1997; in U.S. Pat. No. 5,181,761, issued on Jan. 26, 1993, to Paul Meeker; in U.S. Pat. No. 4,632,456, granted to Kenzou Kassai on Dec. 30, 1986; in U.S. Pat. No. 6,554,358, granted to James Kain on Apr. 29, 2003; and in U.S. Pat. No. 6,428,099, issued to James Kain on Aug. 6, 2002.

In U.S. Pat. No. 6,623,074, granted on Sep. 23, 2003, to Ronald Asbach, et al, the car seat is provided with a vertically movable head rest through which the harness straps are mounted so that the height of the harness straps will automatically be moved vertically with the corresponding positioning of the head rest.

It would be desirable to provide a child's car seat that could be configured in a variety of positions to accommodate the growth of a child without requiring the purchase of other car seats or booster seats that provide a separate size and age appropriate operation. It would also be desirable for such a car seat to provide a conveniently and intuitively operable recline mechanism to enhance the safety and comfort of the child in at least one of the configurations of the car seat. It would also be desirable for such a car seat to provide a harness system that can be re-positioned to accommodate the growth of the child without compromising the operation of the harness tightening mechanism, specifically the connection plate interconnecting the double harness straps and the harness tightening strap.

SUMMARY OF THE INVENTION

It is an object of this invention to provide a car seat for transporting children in an automobile that is capable of being configured in multiple orientations to accommodate the growth in the child using the car seat.

It is a feature of this invention that the seat back is pivotally connected to the seat member.

It is another feature of this invention that the seat back can be lowered to a shipping position that is generally linearly oriented with respect to the seat member.

It is an advantage of this invention that the positioning of the seat back into a shipping position reduces the size of the shipping carton for the car seat.

It is still another feature of this invention that the seat back is detachable from the seat member.

It is another advantage of this invention that the removal of the seat back from the seat member configures the car seat into a booster seat with which the child can use the seat belt of the automobile for security.

It is still another advantage of this invention that a separate booster seat is not required when the child outgrows the car seat in the conventional L-shaped configuration.

It is yet another feature of this invention that the seat back connected to the seat member through a selectively operable latching mechanism.

It is still another feature of this invention that the seat member is mounted on a base member that is positionally adjustable.

It is yet another advantage of this invention that the positioning of the seat member relative to the base member establishes a recline orientation of the car seat.

It is a further feature of this invention that a recline adjustment mechanism is provided between the seat member and the base member to control the recline orientation of the seat.

It is another object of this invention to provide a recline adjustment mechanism that is convenient and intuitive to utilize.

It is still a further feature of this invention that the recline adjustment mechanism is operated by a pull lever located conveniently at the front of the base member.

It is yet another feature of this invention that the pull lever of the recline adjustment mechanism pulls the recline stop paddle off of the recline angle ramp to allow the seat to be rotated about a pivot at the approximate center of gravity of the seat where the recline stop paddle will then move to another step in the recline angle ramp.

It is a further advantage of this invention that the pulling of the pull lever draws the stop paddle directly off the ramp while the lever is pulled outwardly, while a spring retracts the pull lever automatically when the lever is released.

It is still another object of this invention to provide a car seat that includes a harness routing system that permits positional adjustment of the harness to accommodate the growth of the child using the car seat.

It is still another feature of this invention that the harness can be routed through a selected set of a plurality of routing openings in the seat back corresponding to the size of the child while then passing over the top of a hanger member at the top of the seat back before returning to the seat member for engagement with the tightening mechanism.

It is still another advantage of this invention that the connector plate in the harness remains in substantially the same location irrespective of the routing openings selected for passage of the harness from the front of the seat back to the rear of the seat back.

It is yet another advantage of this invention that the length of the harness is not substantially varied by changing the location of the routing openings utilized.

It is yet another object of this invention to provide a seat back with a vertically movable head rest that is selectively positionable relative to the seat back.

It is yet another feature of this invention that the head rest can be selectively positioned to accommodate the growth of the child using the car seat.

It is yet another advantage of this invention that the vertical positioning of the head rest will coordinate with the utilization of the routing openings in the seat back so that the head rest will uncover the routing openings to be used thus positioning the safety harness with respect to the shoulders of the child using the car seat.

It is a further object of this invention to provide a car seat that is durable in construction, inexpensive of manufacture, carefree of maintenance, facile in assemblage, and simple and effective in use.

These and other objects, features and advantages are accomplished according to the instant invention by providing a car seat formed with a seat member pivotally connected to a base member for positional adjustment in desired reclined positions controlled by an intuitively operable adjustment mechanism. The seat back is pivotally connected to the seat member to be oriented in a shipping position or an operative position. A latching mechanism secures the seat back to the seat member in the operative position. The seat back is provided with a head rest that is vertically movable relative to the seat back to uncover routing openings in the seat back as the child grows and the head rest is positioned accordingly. The harness is routed through selected routing openings in the seat back before passing over a hanger at the top of the seat back so that the length of the harness remains constant irrespective of the positioning of the harness in conjunction with the size of the child.

BRIEF DESCRIPTION OF THE DRAWINGS

The advantages of this invention will be apparent upon consideration of the following detailed disclosure of the invention, especially when taken in conjunction with the accompanying drawings wherein:

FIG. 13 is a top plan view of the base member incorporating the recline adjustment mechanism;

FIG. 14 is a perspective view of the base member depicted in FIG. 13;

DETAILED DESCRIPTION OF THE PREFERRED EMBODIMENT

Referring now to FIGS. 1-9, a car seat incorporating the principles of the instant invention can best be seen. The car seat 10 can be configured into a generally conventional L-shaped configuration providing a seat assembly 30 on which the child is supported while being transported in an automobile with an upright seat back 40 supporting the back of the child and a head rest 20 vertically movable on the seat back to support the head of the child positioned in the car seat 10.

The car seat 10 is intended for use with a child larger than an infant, which is typically placed into a rearwardly facing infant car seat until the child is large enough and old enough to be positioned in a forwardly facing car seat 10, which is typically about the first birthday of the child. The car seat 10, however, can be configured in multiple orientations to correspond to the growth of the child until the child is old enough and large enough to safely sit on the car seat using the seat belts of the automobile without benefit of any booster apparatus.

Figure 1:
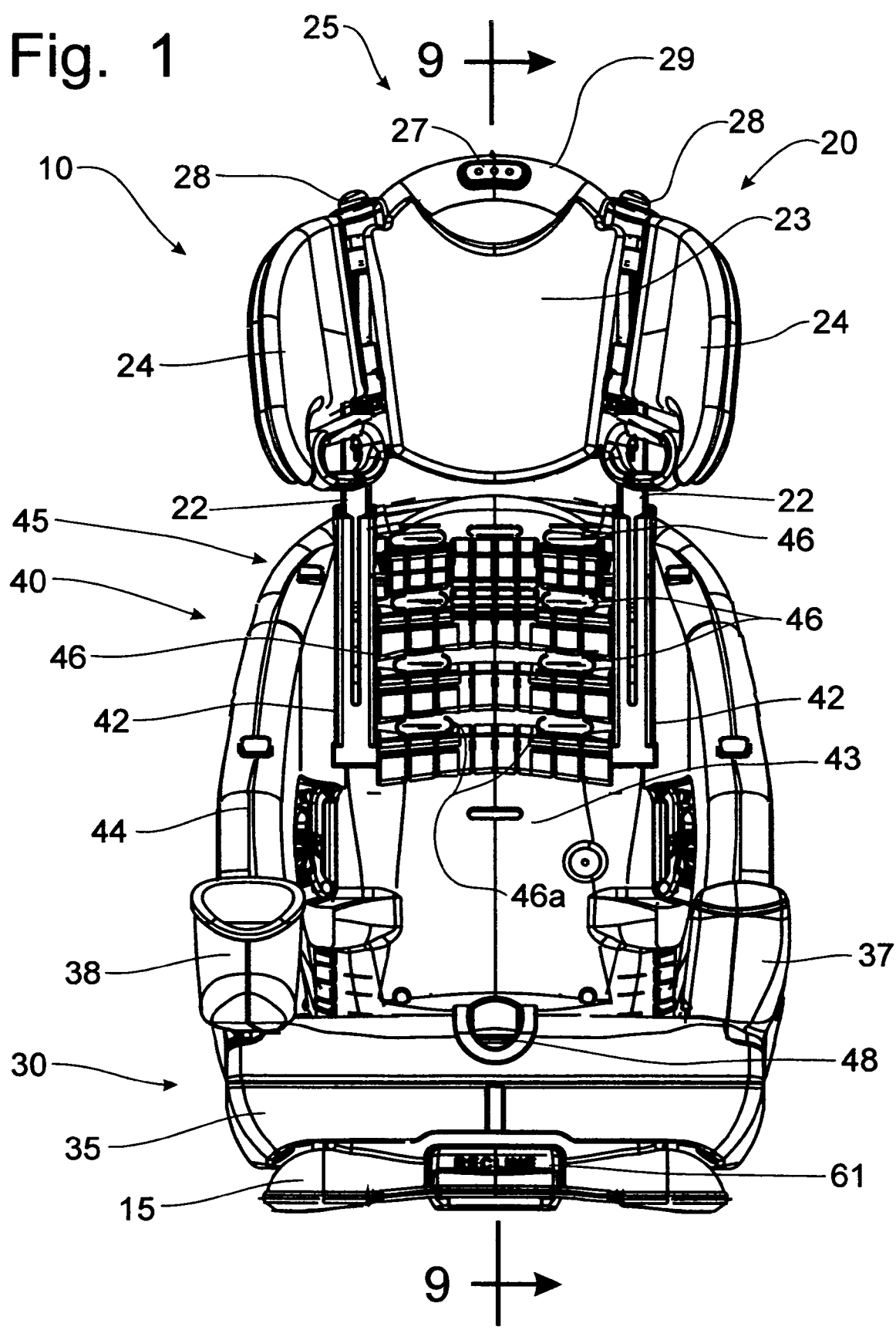
FIG. 1 is a front elevational view of a car seat incorporating the principles of the instant invention, the harness and conventional fabric liner being deleted for purposes of clarity, the head rest being positioned in a vertically extended orientation corresponding to a large toddler positioned in the car seat.
Figure 2:
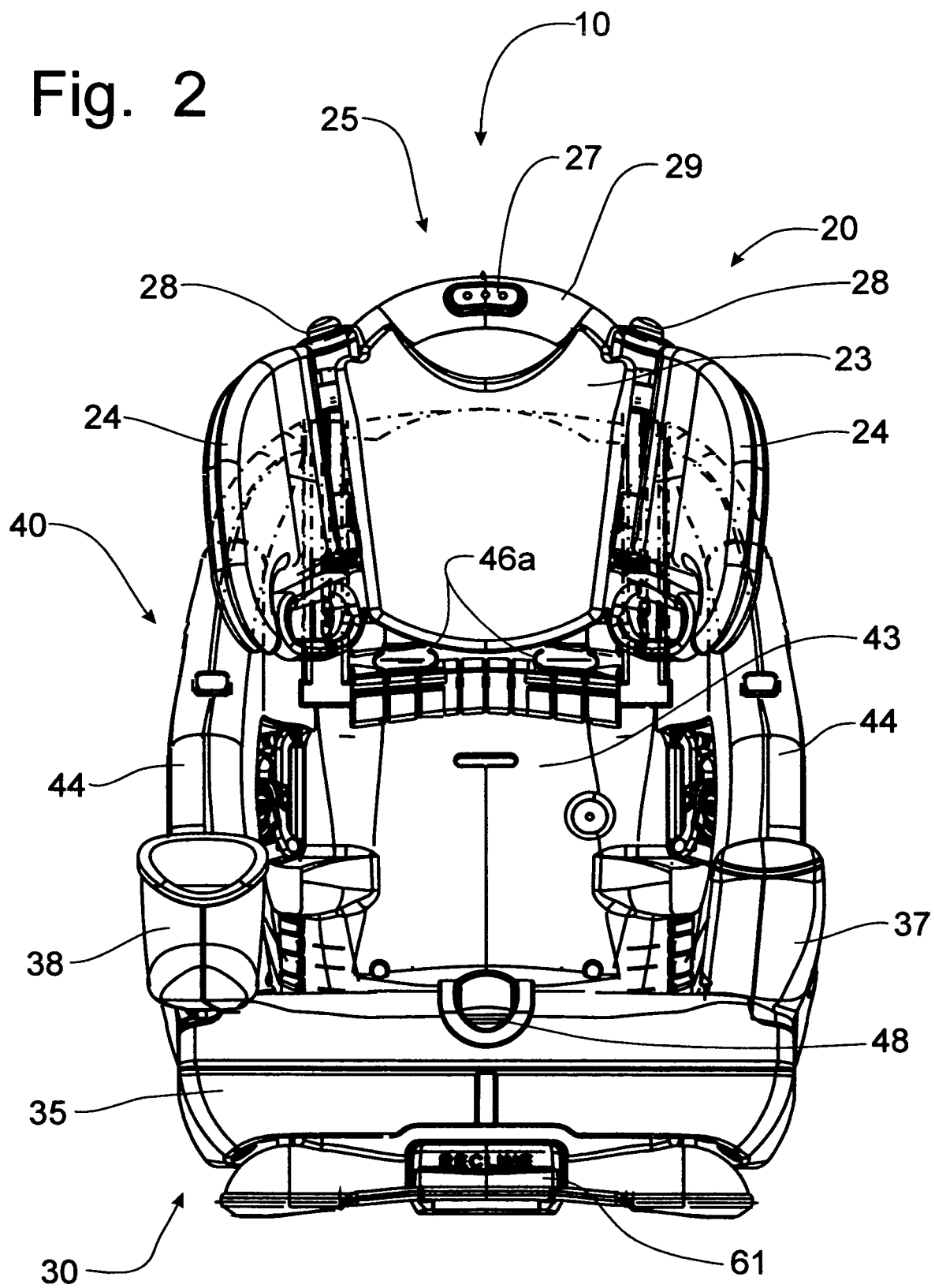
FIG. 2 is a front elevational view of the car seat depicted in FIG. 1, but with the head rest lowered to a position corresponding to a small toddler positioned in the car seat.
Figure 3:
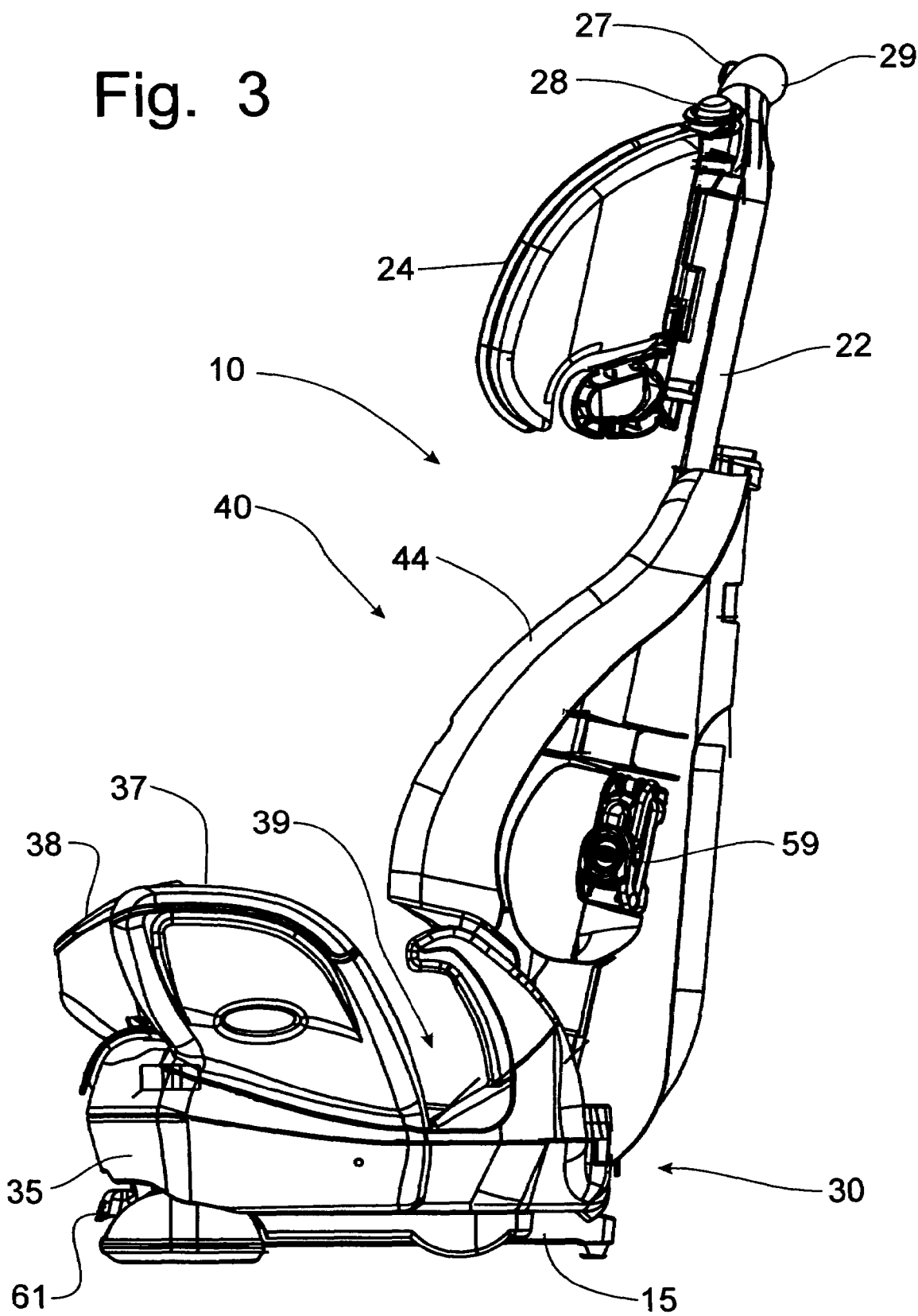
FIG. 3 is a left side elevational view of the car seat depicted in FIG. 1 in the upright, operative position.

Typically, toddlers and young children are placed into the conventional L-shaped configuration of the car seat 10, such as is depicted in FIG. 2, with the head rest 20 lowered onto the upper portion of the seat back 40 to provide proper support for the child's head. The car seat 10 can be re-configured through a movement of the head rest 20 through multiple positions to allow the car seat 10 to be adapted to the growth of the child. FIG. 1 depicts the maximum height of the head rest 20 for use with larger children as a high back booster seat.

As can be seen in FIGS. 1, 2, 5 and 8, the head rest 20 includes a pair of support rails 22 that are received within channels 42 formed at the top of the seat back 40. A latching mechanism 25 is located within the head rest 20 to secure the position of the head rest 20 on the seat back 40. The latching mechanism includes a pair of latch members 26 located at the bottom end of the support rails 22 and an actuator button 27 mounted on the top handle 29 of the head rest 20 to pull on cables (not shown) through a cam mechanism (not shown) in a manner known to one of ordinary skill in the art. The latch members 26 are engagable with openings (not shown) in the channels 42 to secure the support rails 22 within the channels 42 throughout the full range of vertical movement of the head rest 20 relative to the seat back 40. Preferably, the top of the channels 42 is formed with a retainer clip 42a that engages a protrusion (not shown) on the lower end of the support rails 22 to prevent the head rest 20 from being removed from the seat back 40 once installed.

Preferably, the head rest 20 is formed with a back support portion 23 and a pair of wings 24 projecting forwardly of the back support portion 23 and at an angle corresponding to the orientation of the side wings 44 of the seat back 40 so that the head rest 20 will nest properly along the upper portion of the seat back 40, as is depicted in FIG. 2, when the head rest 20 is in a lowered position. Preferably, the wings 24 are pivotally positionable to aid in the comfort of the child being transported on the car seat 10. Accordingly, the wings 24 are connected to the back portion 23 by a pivot mechanism 28 that permits the selective positioning of the wings 24. The head rest 20 is also formed with a shoulder belt guide 21 that is mounted to the frame of the head rest 20 to be movable vertically therewith, and positioned beneath the side wings 24, to be used to restrain the automotive shoulder belt when the car seat 10 is used in a high back booster mode, as described below. The shoulder belt guide 21 has a slot formed therein for the passage of the automotive shoulder belt into the interior of the guide 21.

The seat back 40 has a rear support portion 43 from which the side wings 44 extend in a fixed monolithic structure. The upper part of the rear support portion 43 includes a harness routing apparatus 45 including a plurality of pairs of routing openings 46 spaced vertically between the channels 42. The harness routing apparatus 45 allows the passage of the harness 49, best seen in FIG. 9, through the seat back to establish a proper fit on the child's shoulders positioned in the car seat 10. The harness 49 will pass through a selected pair of routing openings 46 to traverse from the front of the seat back 40 to the rear of the seat back 40, establishing a support point on the seat back 40 for the harness 49 being routed through the seat back 40. The harness straps 49 then extend upwardly from the selected routing openings 46 on the rearward side of the seat back 40 to a hanger 47 positioned at the top of the rear support portion 43. The harness straps 49 then turn over top of the hanger 47 and extend downwardly to the bottom of the rear support portion 43 where the harness straps 49 extend forwardly to the conventional harness tightening apparatus 48 at the front part of the seat assembly 30.

As is best seen in FIG. 2, the lowermost position of the head rest 20 leaves the lowermost routing openings 46a exposed for access in the routing of the harness straps 49 through the rear support portion 43 of the seat back 40. The harness 49 is formed as a pair of straps to pass over the shoulders of the child in the car seat 10, then through the routing openings 46 in the seat back 40, around the hanger 47 and to a conventional connection plate 49a located behind the lower part of the rear support portion 43. The connection plate 49a is connected to the two harness straps extending downwardly from the hanger 47 and to a single strap extending through the seat assembly 30 to the tightening mechanism 48.

By passing the harness straps 49 through selective routing openings 46 in the seat back 40, the overall length of the harness 49 does not change substantially. As a result, the connection plate 49a will remain in substantially the same location irrespective of the set of routing openings 46 selected for the passage of the harness straps 49. In conventional car seats, the relocation of the harness to a different height to accommodate growth in the child changes the vertical position of the connection plate, sometimes interfering with the passage of the single harness strap through the seat member.

Figure 4:
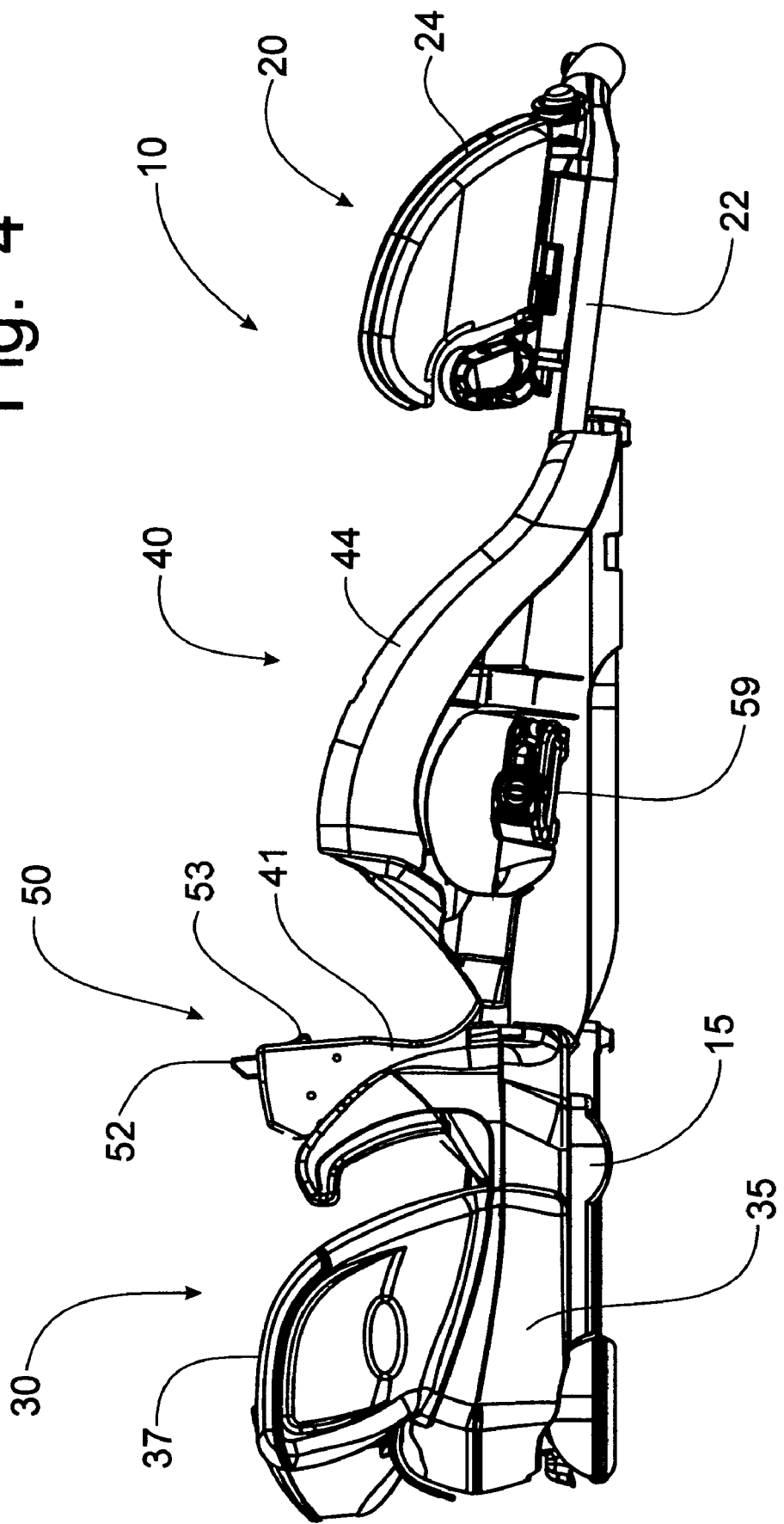
FIG. 4 is a left side elevational view of the car seat depicted in FIG. 1 but with the seat back unlatched and pivoted into a shipping position, the head rest being depicted in a vertically extended position before being detached from the seat back.
Figure 5:
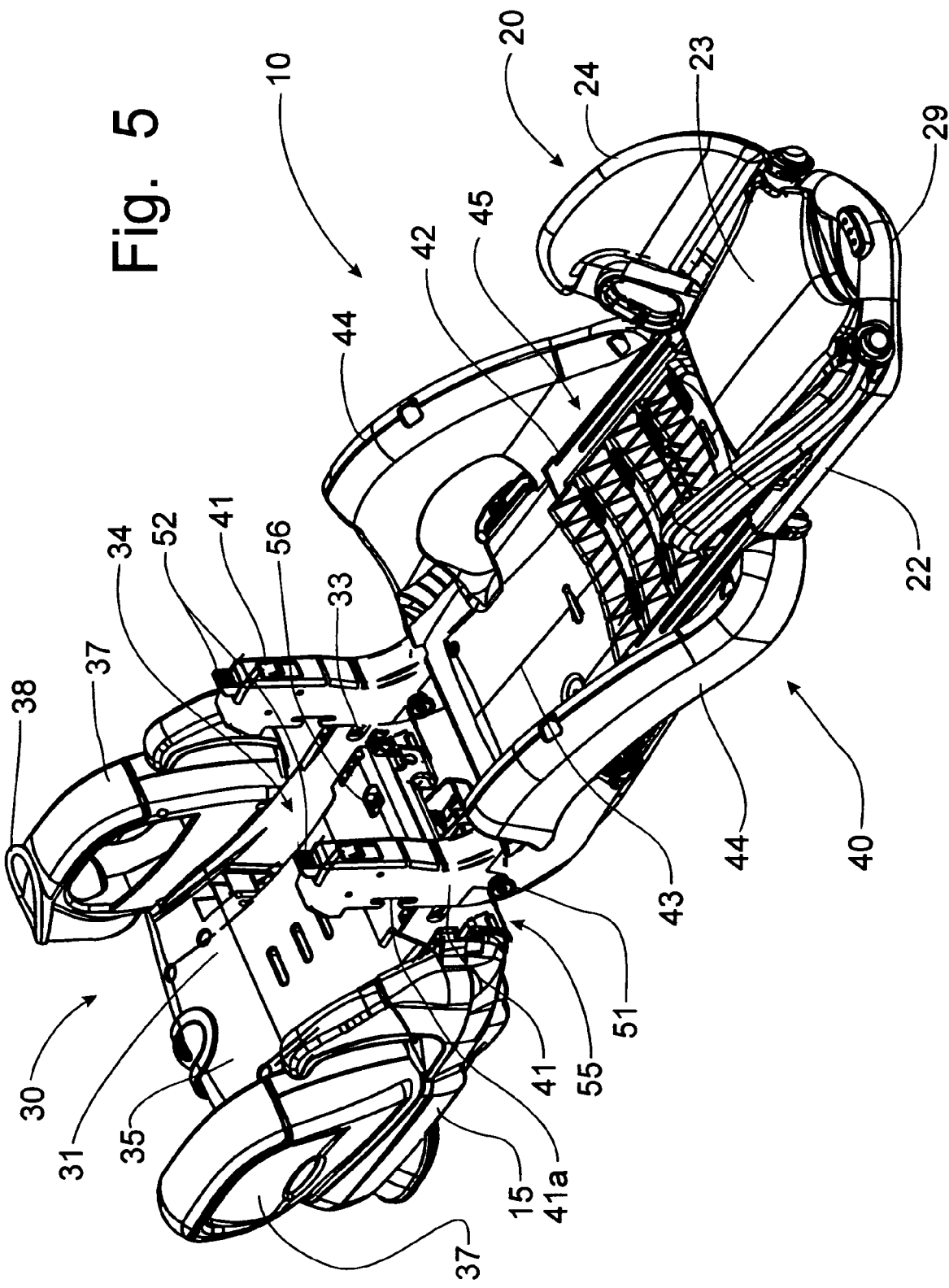
FIG. 5 is a perspective view of the car seat with the seat back removed from the seat member so that the seat member can be configured as a booster seat.
Figure 6A:
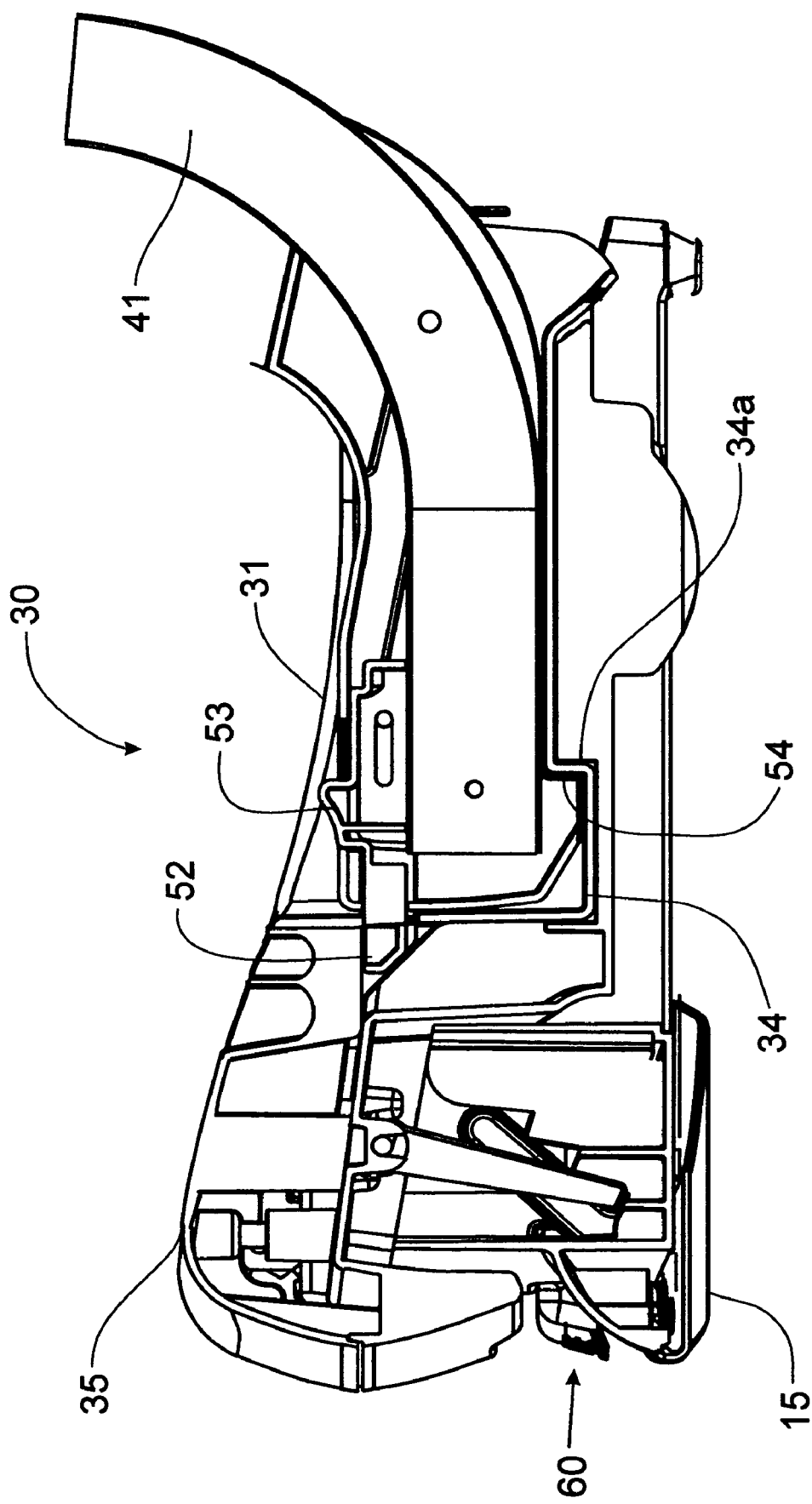
FIG. 6 is a left side elevational view of the seat back detached from the seat member, the head rest also being detached from the seat back.
Figure 7:
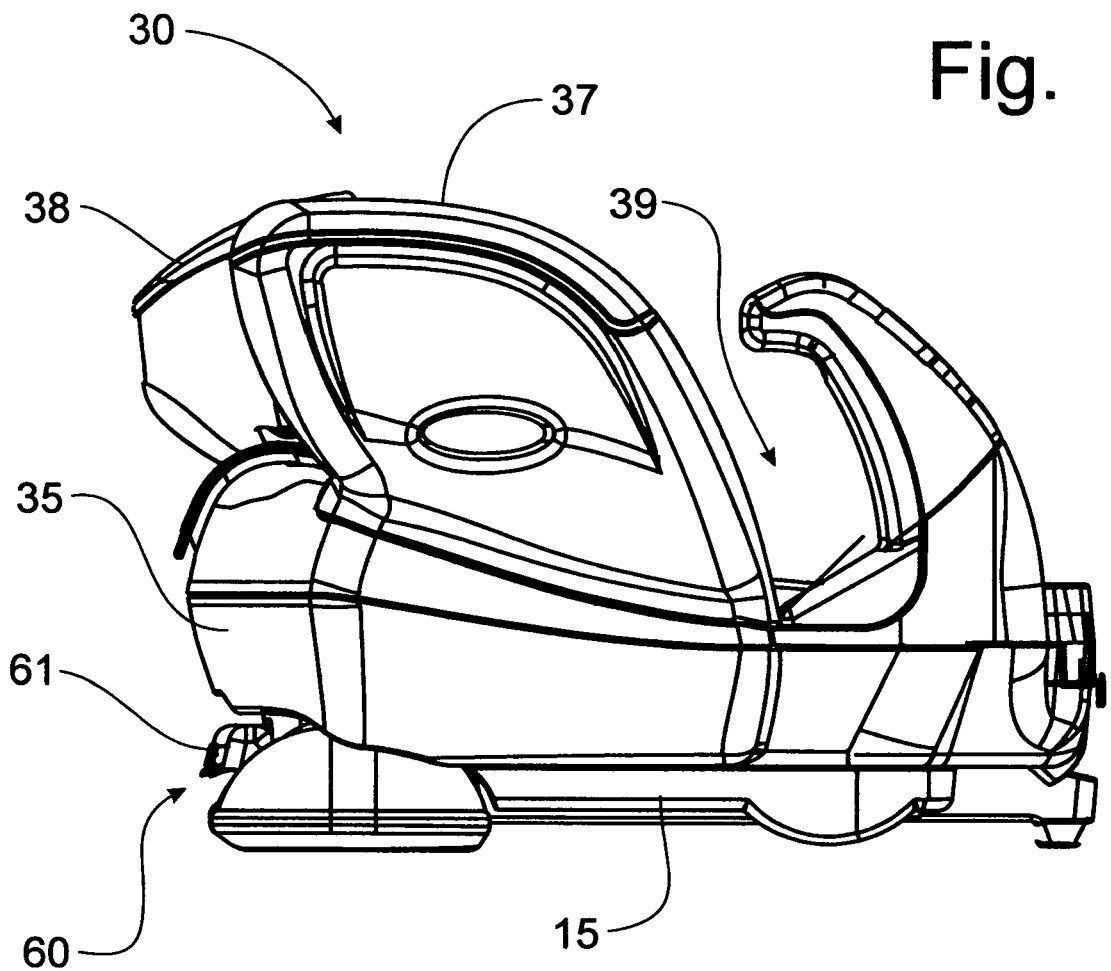
FIG. 7 is an enlarged left side elevational view of the seat member configured as a booster seat.
Figure 8:
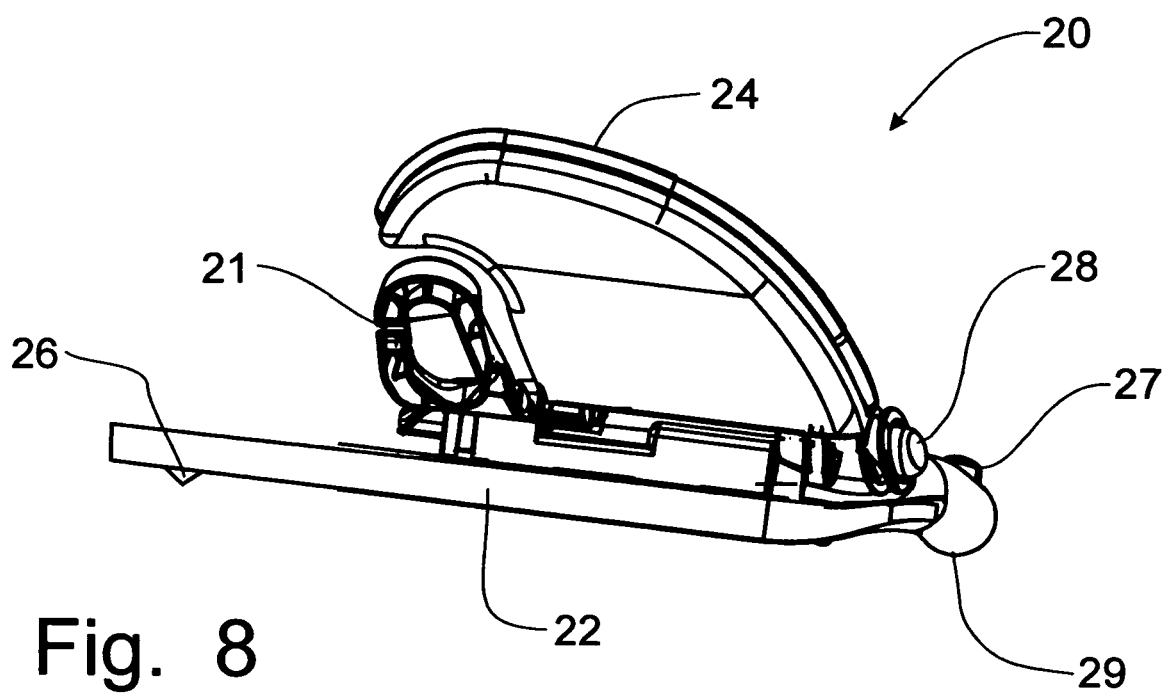
FIG. 8 is an enlarged left side elevational view of the head rest.
Figure 9:
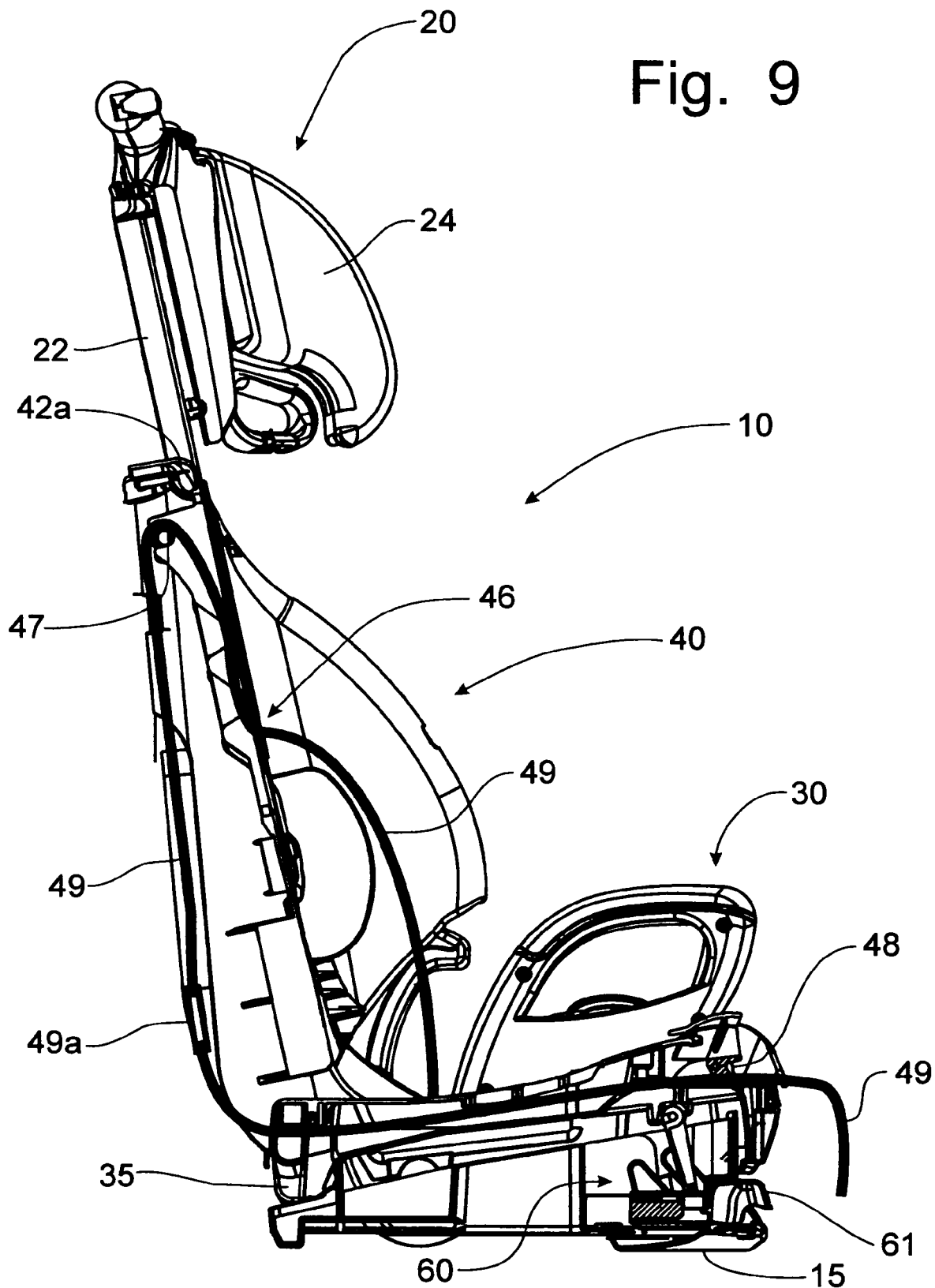
FIG. 9 is a cross-sectional view of the car seat taken along lines 9—9 of FIG. 1 showing the path of the harness through the seat back and around a hanger at the top of the seat back.
Figure 10:
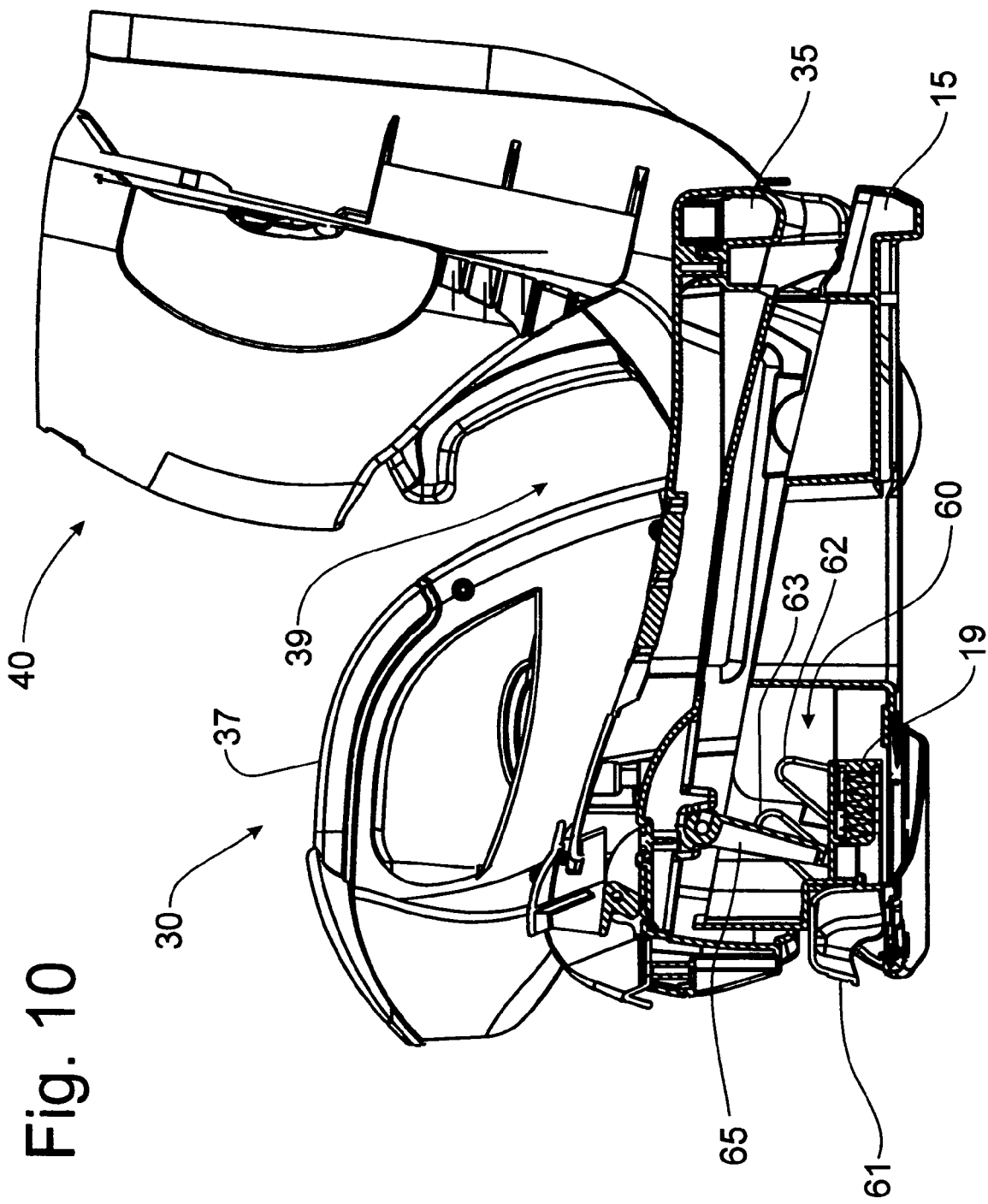
FIG. 10 is an enlarged partial cross-sectional view of the car seat to show the recline adjustment mechanism in a zero degree tilt orientation.

Referring now to FIGS. 4-6, the seat back 40 is detachable from the seat assembly 30 through a seat back locking mechanism 50 to permit the seat assembly 30 to be used as a booster seat, a configuration of the car seat 10 applicable to larger children that still need to have some height in the automotive seat in order to make the automobile's seat belts to fit properly. The seat back 40 is formed with a pair of laterally spaced attachment arms 41 that project forwardly from the rear support portion 43 at the lowermost part thereof. The seat back 40 is also formed with a pair of laterally opposed mounting pins 51 that project outwardly laterally from the lowermost portion of the seat back 40. The T-shaped mounting pins 51 are positioned to be received in a pivot socket 33 formed in the seat assembly 30.

The seat assembly 30 has a pivot locking mechanism 55 at the rearward portion thereof that can be actuated by a spring-loaded switch 56. The pivot locking mechanism 55 captures the mounting pins 51 in the pivot sockets 33 to secure the seat back 40 onto the rear of the seat assembly 30. The seat back 40 can then pivot about the mounting pins 51 relative to the seat assembly 30. The forward pivotal movement of the seat back 40 from the shipping position shown in FIGS. 4 and 5 to the operative position depicted in FIGS. 1-3 and 9, lowers the attachment arms 41 into the receptacles 34 formed in the seat assembly 30. As can be seen best in FIGS. 6 and 6A, the ends of the attachment arms 41 are formed with an offset step 54 that engages a corresponding depression 34a in the receptacle 34 to prevent the attachment arms 41 from pulling straight rearwardly once latched into position.

Each of the attachment arms 41 includes a spring-loaded latch 52 that is released by a switch 53 mounted on top of the attachment arm 41. When the attachment arms 41 are lowered into the receptacles 34, the spring-loaded latches 52 retract to allow the attachment arms 41 to properly seat within the receptacles 34. The release of the attachment arms 41 from the receptacles 34 requires the manipulation of the latches 52 to overcome the spring force exerted on the latches 52, thus allowing the seat back 40 to pivot rearwardly about the mounting pins 51. As can be seen in FIGS. 4-6, each of the attachment arms 41 are formed with a slot 41a for receiving the free end of the harness to trap the harness in the assembled car seat 10 package.

To minimize the size of the shipping package, the car seat 10 can be shipped in the unassembled configuration depicted in FIG. 5 with the seat back 40 removed from the seat assembly 30, or in the shipping position depicted in FIG. 4 with the seat back 40 and head rest 20 attached to the seat assembly 30. The head rest 20 can be positioned at the lowermost position on the seat back, as depicted on FIG. 2, or preferably removed from the seat back and placed on top of the seat back 40 between the side wings 44. Instead of the conventional L-shaped monolithic shell requiring a substantial amount of wasted space within the shipping package, the unassembled car seat 10 can be shipped an a rectangular package that is reduced substantially as compared to the shipping package required for the conventional L-shaped monolithic shell car seat.

The seat assembly 30 has an upper, generally horizontally extending support surface 31 on which the child sits while using the car seat 10. The seat assembly 30 is formed as a seat member 35 pivotally connected at a pivot axis 36 to a base member 15. The pivotal connection between the seat member 35 and the base member 15 allows the seat member 35 to recline or tilt relative to the base member 15, which is always supported on the automotive seat (or other appropriate support structure). With the seat back 40 attached to the seat member 35, this tilting of the seat member 35 relative to the base member 15 results in a reclining of the entire portion of the car seat 10 in contact with the child seated therein. Accordingly, the child can be selectively reclined to the desired position at the comfort of the child. The seat member 35 is also formed with laterally opposing arm rests 37 defining the physical sides of the seating support surface 31. At least one of the arm rests 37 can include a cup holder 38.

Figure 11:
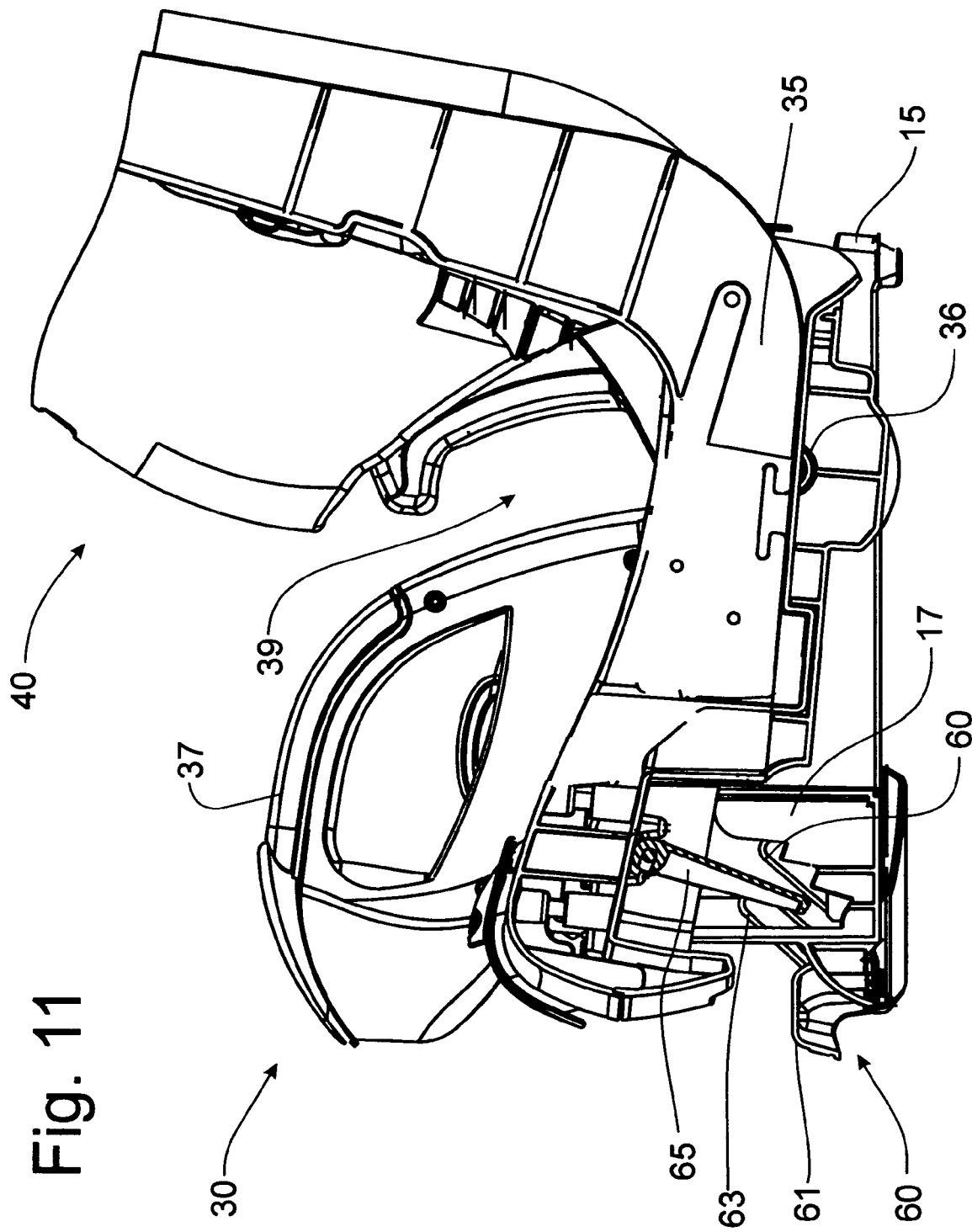
FIG. 11 is an enlarged partial cross-sectional view of the car seat similar to that of FIG. 10, but showing the recline adjustment mechanism in a five degree tilt orientation, the actuation handle being shown in an extended actuation position and the paddle member being shown pivoted away from the stepped ramp with the actuation handle.
Figure 12:
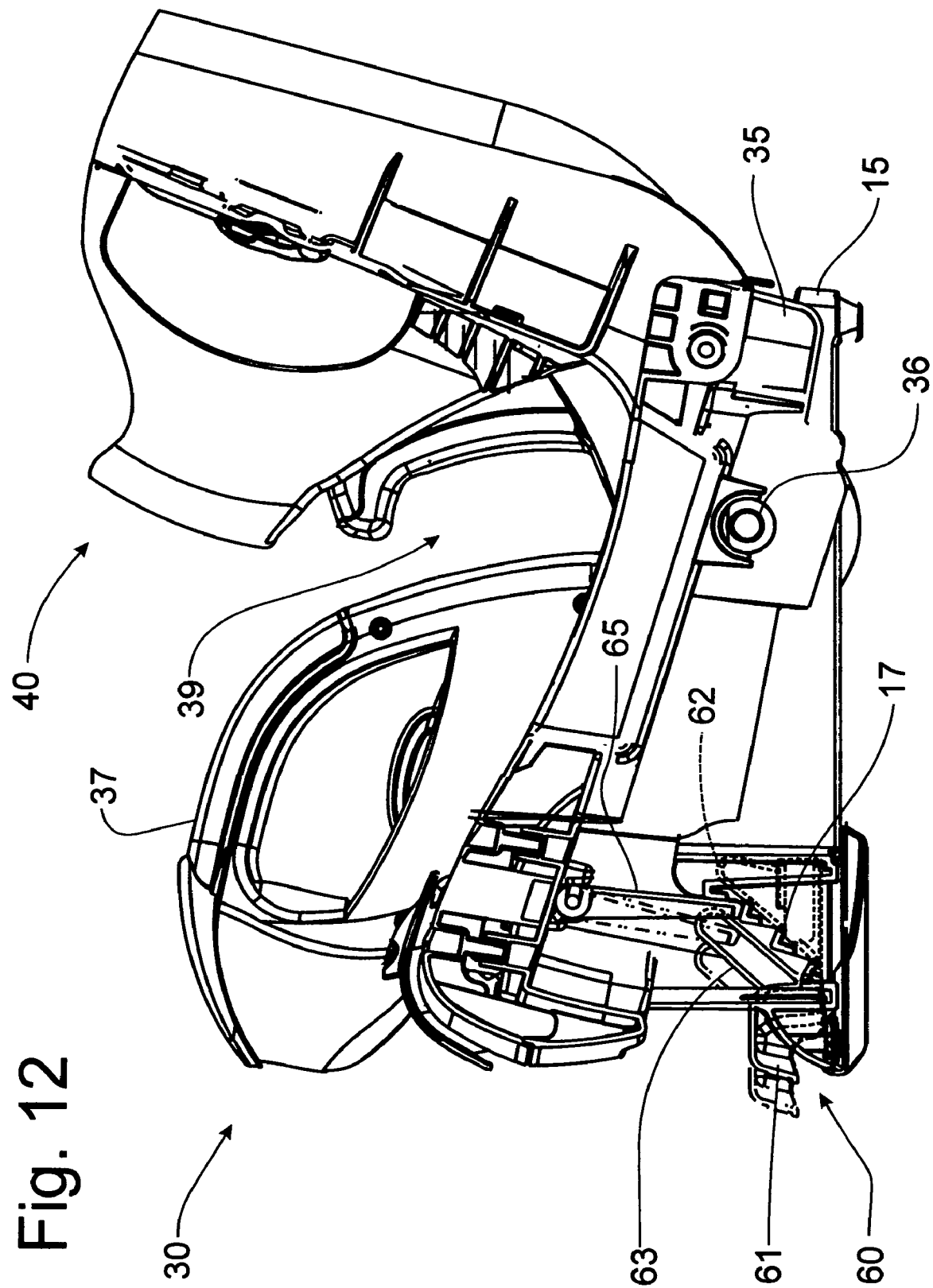
FIG. 12 is an enlarged partial cross-sectional view of the car seat similar to that of FIG. 10, but showing the recline adjustment mechanism in a ten degree tilt orientation, the movement of the actuation handle and the paddle member being shown in phantom.
Figure 15:
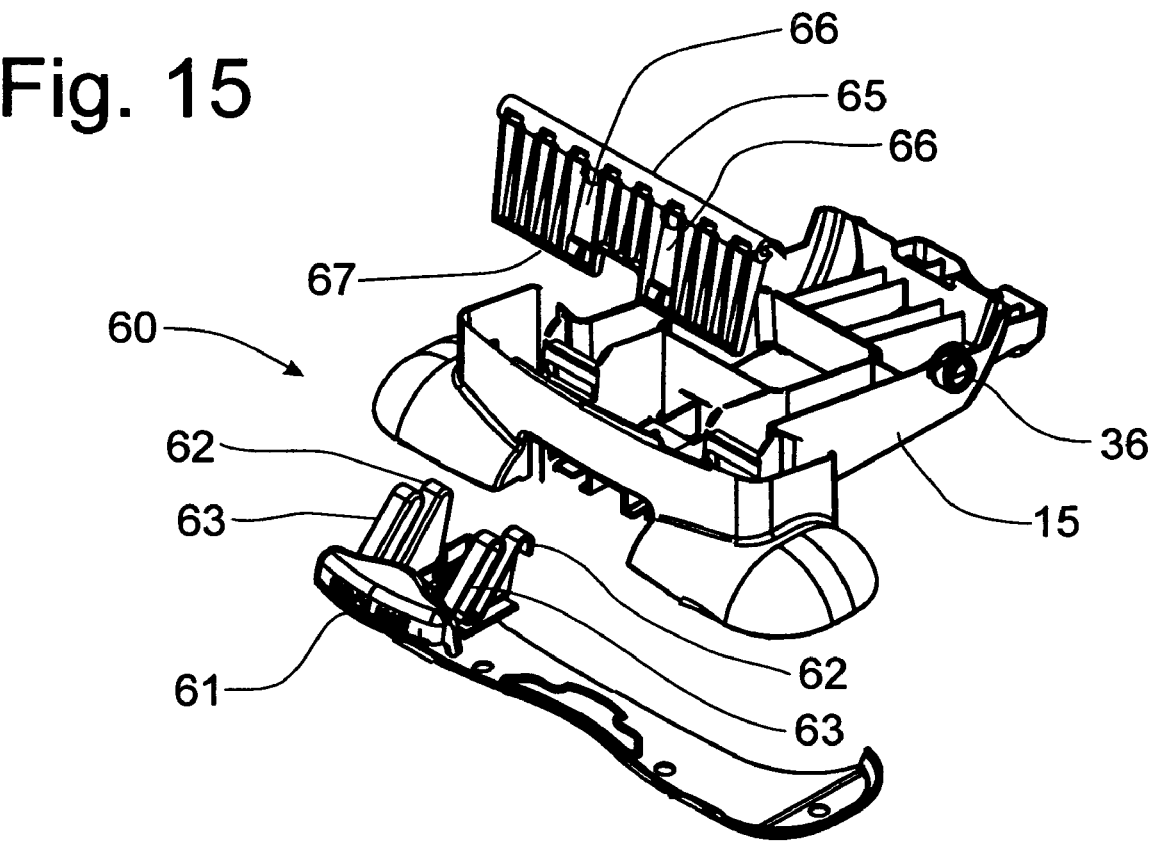
FIG. 15 is an exploded perspective view of the base member shown in FIG. 14.
Figure 16:
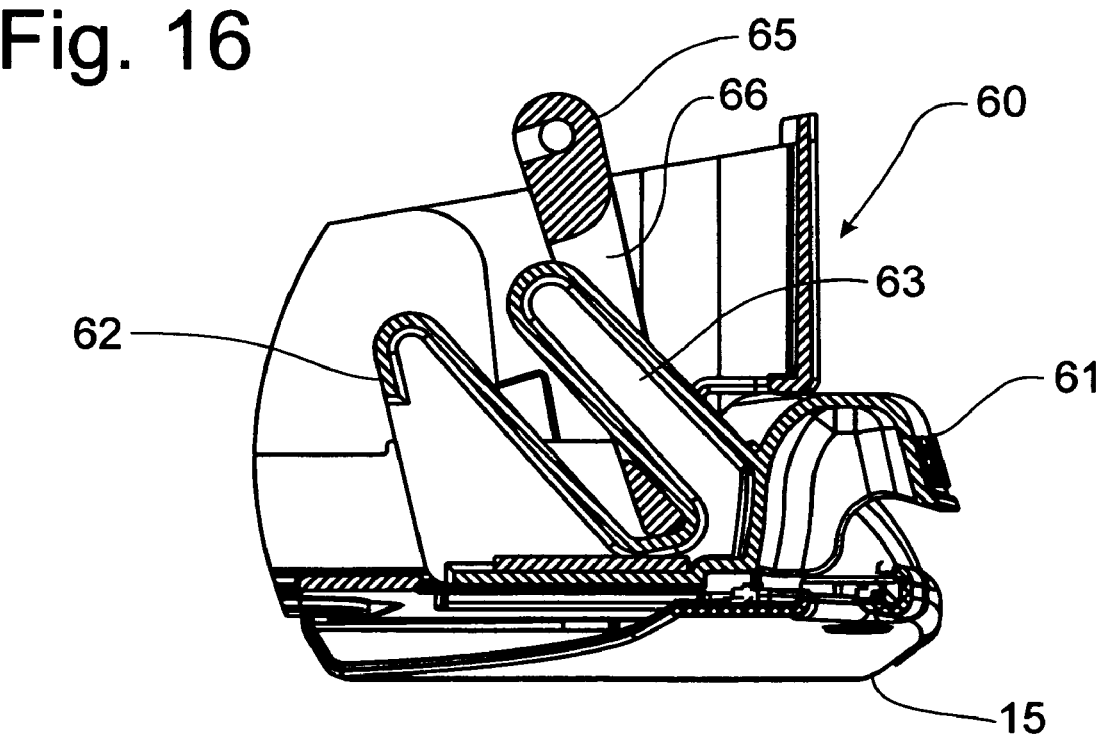
FIG. 16 is a partial enlarged cross-sectional view of the base member depicting an elevational view of the recline adjustment mechanism in the zero tilt orientation corresponding to lines 16—16 in FIG. 13 taken through the opening in the recline paddle member.

Interposed between the seat member 35 and the base member 15 is a recline adjustment mechanism 60 to secure the seat member 35 and attached components 20, 40, in the selected recline position. The recline adjustment mechanism 60 is best seen in FIGS. 10-18. An actuator handle 61 is slidably supported on the base member 15 at the forwardmost portion thereof for movement between a home position, such as is depicted in FIG. 16, and an actuation position, such as is depicted in FIGS. 11 and 12. Attached to the actuator handle 61 are first and second paddle trap members 62, 63. A recline paddle 65 is pivotally mounted on the seat member 35 and hangs down therefrom for engagement with the paddle trap members 62, 63, as will be described in greater detail below. The recline adjustment mechanism 60 also includes a stepped ramp 17 fixed to the base member 15. A compression spring 19 is mounted on a mounting member and fixed between the actuation handle 61 and the base member 15 so that the movement of the actuation handle 61 to the actuation position creates a biasing force in the spring 19 to urge the actuation handle 61 into the home position.

As can best be seen in FIGS. 13-16, the recline paddle 65 is formed as an elongated member positioned laterally across a cavity in the base member 15. The central part of the recline paddle 65 is formed with a pair of openings 66 through which the second paddle trap members 63 can pass to extend through the recline paddle 65. Both the first and second paddle trap members 62, 63 are angled rearwardly at substantially the same angle as the stepped ramp 17, but spaced apart to trap the tip 67 of the recline paddle 65 between the two paddle trap members 62, 63. When the actuator handle 61 is moved outwardly against the biasing force exerted by the compression spring 19, the first paddle trap member 62 pushes the recline paddle 65 forwardly away from the step 18 on the ramp 17 so that the seat member 35 can be moved to the desired recline or tilt angle relative to the base member 15.

Releasing the actuation handle 61, allows the spring 19 to return the actuation handle 61 to the home position whereupon the second paddle trap member 63 pushes the paddle 65 back into engagement with the selected step 18 on the stepped ramp 17, thus locking the recline adjustment mechanism 60 in place. To further secure the recline paddle 65 to the stepped ramp 17, the tip 67 of the recline paddle 65 is formed with a rearwardly extending protrusion 68 that is engaged beneath the step 18 on the stepped ramp 17 above which the recline paddle 65 is seated.

Figure 17:
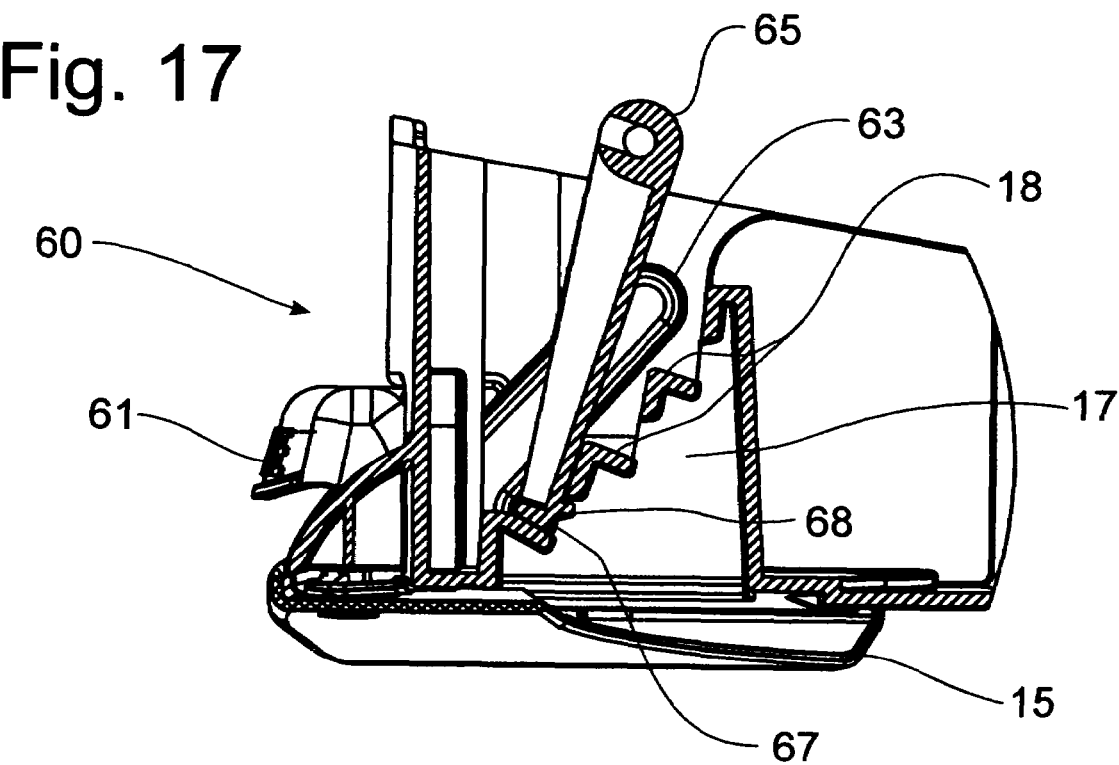
FIG. 17 is a partial enlarged cross-sectional view of the base member corresponding to lines 17—17 in FIG. 13 to show an elevational view of the recline adjustment mechanism in the five degree tilt orientation.
Figure 18:
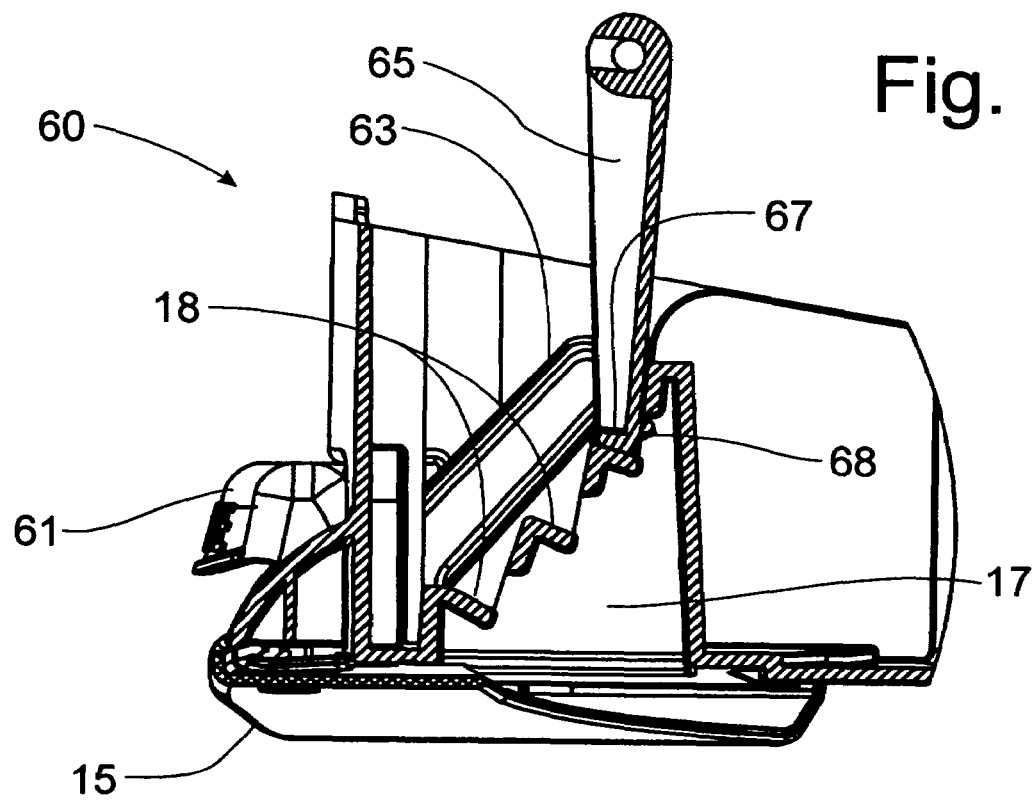
FIG. 18 is a partial cross-sectional view of the base member similar to that of FIG. 17 except that the recline adjustment mechanism is in a ten degree tilt orientation.

To operate the recline adjustment mechanism 60, the actuator handle 61 is pulled outwardly to release the recline paddle 65 from the stepped ramp 17. The seat member 35 is then manually positioned at the desired tilt or recline angle, which corresponds to one of the steps 18 on the stepped ramp 17. Preferably, the seat member 35 is pivotally movable about the axis 36 between three set recline angles, zero degrees, five degrees and ten degrees. The stepped ramp 17 has a step corresponding to each of these predetermined recline angle designations. When the operator has selected the desired recline angle, the tip 67 of the recline paddle 65 will be seated on the corresponding step once the actuation handle 61 has been released to return to the home position. For example, FIG. 17 depicts the zero degree angle orientation, while FIG. 18 depicts the ten degree angle orientation.

The actuator handle 61 is then released to allow the compression spring 19 to retract the actuator handle 61 and paddle trap members 62, 63 in the home position. Since the second paddle trap member 63 is oriented parallel to the angle of the stepped ramp 17, the second paddle trap member 63 will trap the tip 67 of the recline paddle 65 against whichever step 18 has been selected, as is depicted in FIGS. 17 and 18. The rearward protrusion 68 helps secure the seat member 35 in the selected recline angle by being engaged into the stepped ramp 17. The paddle trap member 63 prevents the recline paddle 65 from moving away from the stepped ramp 17 and disengaging the protrusion 68 therefrom.

In operation, the car seat 10 is preferably shipped to the consumer in an flat orientation, such as is depicted in FIG. 4, with the seat back 40 and the head rest 20 mounted on the seat assembly 30. If shipped in the unassembled condition, as seen in FIG. 5, the consumer, after removing the car seat 10 from the shipping container, needs only to push the seat back 40 into engagement with the seat assembly 30 by snapping the mounting pins 51 into the pivot sockets 33. The pivot locking mechanism 55 is spring-loaded and will automatically lock the mounting pins 51 into the pivot sockets 33. The seat back 40 can then be pivoted on the mounting pins 51 and raised into the conventional L-shaped configuration at which point the attachment arms 41 will be received within the receptacles 34 with the spring-loaded locking mechanism 50 automatically locking the attachment arms 41 into the proper position. If received in the flat shipping orientation shown in FIG. 4, the seat back 40 need only be pivoted into the upright position to ready the car seat 10 for use.

The head rest 20 can then be mounted onto the seat back 40 by sliding the support rails 22 into the receiver channels 42 at the top portion of the seat back 40. After the head rest 20 is assembled, the latching mechanism 25 will have to be retracted by depressing the actuator button 26 until the head rest 20 is positioned on the seat back 40 at the desired height relative to the seat assembly 30. The latching mechanism 25 can then be released to secure the head rest in the desired vertical position. Assuming that the child to be transported in the car seat 10 is sufficiently small to require the use of the harness 49, the harness 49 should be routed through the proper set of routing openings 46 which will most likely be the pair of routing openings located immediately below the bottom of the head rest 20.

The car seat 10 is secured to the automobile seat by the automobile seat belts (not shown). The lap belt (not shown) is passed through the passageway 39 in the seat assembly to be locked into place. The shoulder belt (not shown) is secured to the seat back 40 in a tensioned state by pulling on the shoulder belt and clamping it in the belt clamps 59 located on opposing sides of the rear face of the seat back 40. Option conventional tethers (not shown) can also be utilized to secure the car seat on the automobile seat.

Once properly secured to the automobile seat, the car seat 10 is ready for use. As the child grows in size, the car seat 10 can be reconfigured to accommodate the growth. The recline angle can be adjusted through the operation of the recline adjustment mechanism 60, as described above, to fit the size and comfort of the child. The head rest 20 can be repositioned vertically, along with the harness 49 routing, to match the size of the child.

Eventually, the child will grow to the stage where the harness is not necessary, as the automotive seat belts can provide a secure environment for the transportation of the child, though the child is not yet large enough for the automotive seat belts to fit the child properly. In this situation, the seat back 40 can be removed from the seat assembly 30 by first releasing the switch 53 to allow the attachment arms 41 to move out of the receptacles 34 as the seat back 40 is pivoted rearwardly on the mounting pins 51. The switch 56 can then be release to allow the mounting pins 51 to be removed from the pivot sockets 33, thereby allowing the seat back 40 to be removed from the seat assembly 30. The seat assembly 30, in the form depicted in FIG. 7, can then be utilized as a booster seat which elevates the child sufficiently above the automobile seat to allow the automobile seat belts to have a proper fit on the child being transported.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A car seat for use in an automobile to transport a child, comprising:
   a seat assembly defining a generally horizontal seat surface for supporting a child positioned thereon, said seat assembly including a pair of receptacles; and
   a seat back having a locking mechanism for selectively detachably connecting said seat back to said seat assembly, said seat back including a rear support portion oriented in generally upright position when attached to said seat assembly, said seat back having a pair of attachment arms projecting generally perpendicularly outwardly relative to said rear support portion for engagement with said seat assembly so as to be received within corresponding said receptacles.

2. The car seat of claim 1 further comprising a head rest mountable on said seat back and being vertically positionable relative thereto, said head rest including a latching mechanism to secure the head rest is a desired position relative to said seat back.

3. The car seat of claim 2 wherein said seat back is formed with a plurality of sets of routing openings in said rear support portion for the passage of harness straps from a front side of said seat back to a rear side of said seat back, at least one set of routing openings being located below said head rest irrespective of the desired position of said head rest on said seat back.

4. The car seat of claim 3 wherein said harness straps are routed upwardly from the selected set of routing openings to a hanger mounted at a top portion of said rear support portion of said seat back, said harness straps being looped around said hanger before extending downwardly into said seat assembly.

5. The car seat of claim 1 wherein said locking mechanism includes a latching apparatus on each said attachment arm for securing said attachment arm to said seat assembly.

6. The car seat of claim 5 wherein each said attachment arm is formed with an offset step to engage a correspondingly shaped depression in said receptacle to restrain linear movement of said attachment arm along said seat assembly.

7. The car seat of claim 6 wherein said seat back further includes a pair of opposing laterally extending mounting pins engagable with corresponding pivot sockets formed in said seat assembly so that said seat back is pivotable relative to said seat assembly.

8. The car seat of claim 7 wherein said locking mechanism further includes a pivot lock mechanism for securing said mounting pins in said pivot sockets, said pivot lock mechanism being operable to affect disengagement of said mounting pins from said pivot sockets to permit said seat back to be separated from said seat assembly.

9. The car seat of claim 1 wherein said seat assembly comprises:
   a base member;
   a seat member pivotally connected to said base member; and
   a recline adjustment mechanism operably interconnecting said base member and said seat member to control the pivotal movement of said seat member on said base member.

10. The car seat of claim 9 wherein said recline adjustment mechanism comprises:
    an actuation handle movably supported on said base member for movement between a home position and a release position;
    a stepped ramp fixed to said base member and including a plurality of steps corresponding respectively to predefined recline angles of said seat member relative to said base member; and
    a recline paddle pivotally connected to said seat member and engagable with a selected one of said steps to secure said seat member at the selected predefined recline angle.

11. The car seat of claim 10 wherein said actuation handle includes a paddle trap member operable to lock said recline paddle against said stepped ramp when said actuation handle is in said home position.

12. A recline adjustment mechanism for a car seat having a seat member pivotally supported on a base member for pivotal movement through a plurality of recline angles, said recline adjustment mechanism operably interconnecting said seat member and said base member to control the pivoted recline angle of said seat member, comprising:
    an actuation handle supported for movement between a home position and a release position;
    a stepped ramp fixed to said base member and including a plurality of step positions corresponding respectively to predefined recline angles of said seat member relative to said base member;
    a recline paddle pivotally associated with said actuation handle and being engagable with a selected one of said step positions to secure said seat member at the selected predefined recline angle; and
    a paddle trap apparatus being operable to secure said recline paddle into engagement with the selected step position when said actuation handle is in said home position.

13. The recline adjustment mechanism of claim 12 wherein said recline paddle is formed with an opening therein, said paddle trap apparatus including a first paddle trap member oriented to pass through said opening to trap said recline paddle against said stepped ramp.

14. The recline adjustment mechanism of claim 13 wherein said recline paddle is formed with a distal tip that engages said steps on said stepped ramp, said tip being formed with a protrusion that extends into a hole formed in said stepped ramp to secure said recline paddle against said stepped ramp.

15. The recline adjustment mechanism of claim 14 further comprising a spring anchored on said base member and engaged with said actuation handle to bias said actuation handle toward said home position.

16. The recline adjustment mechanism of claim 15 wherein said actuation handle and said paddle trap apparatus is an integral device slidably mounted on said base member for movement between said home and release positions.

17. The recline adjustment mechanism of claim 14 wherein said paddle trap apparatus further includes a second paddle trap member spaced from said first paddle trap member to position said distal tip of said recline paddle therebetween.

18. A car seat for use in an automobile to transport a child, comprising:
    a seat assembly defining a generally horizontal seat surface for supporting a child positioned thereon, said seat assembly being formed with a pair of laterally spaced receptacles in said seat surface and a pair of laterally spaced pivot sockets;
    a seat back selectively detachably connected to said seat assembly, said seat back including a rear support portion oriented in generally upright position when attached to said seat assembly and a pair of attachment arms projecting outwardly relative to said rear support portion for engagement with said seat assembly, said seat back being formed with a pair of opposing laterally extending mounting pins engagable with said pivot sockets so that said seat back is pivotable relative to said seat assembly; and
    a locking mechanism mounted on said attachment arms for securing said attachment arms within said receptacles in said seat assembly and being operable between a locking position in which said locking mechanism is operable to engage said seat assembly to structurally integrate said attachment arms into said seat assembly and lock the seat back into a generally upright orientation with respect to the seat assembly and a release position in which said attachment arms are free to disengage said seat assembly.

19. The car seat of claim 18 further comprising:
    a pivot lock mechanism for securing said mounting pins in said pivot sockets, said pivot lock mechanism allowing said mounting pins to be disengaged from said pivot sockets such that said seat back can be removed from said seat assembly.

20. The car seat of claim 18 wherein said seat back is formed with a plurality of sets of routing openings in said rear support portion for the passage of harness straps from a front side of said seat back to a rear side of said seat back, said harness straps being routed upwardly from the selected set of routing openings to a hanger mounted at a top portion of said rear support portion of said seat back, said harness straps being looped around said hanger before extending downwardly into said seat assembly.

21. The car seat of claim 18 further comprising:
a head rest mountable on said seat back and vertically positionable relative thereto, said head rest including a latching mechanism to secure the head rest is a desired position relative to said seat back, at least one set of routing openings being located below said head rest irrespective of the desired position of said head rest on said seat back.

22. The car seat of claim 18 wherein attachment arms project generally perpendicularly outwardly relative to said rear support portion for engagement with said seat assembly to be positioned within said receptacles substantially forwardly of said seat back.

* * * * *